(12) United States Patent
Tsuruo

(10) Patent No.: US 6,186,588 B1
(45) Date of Patent: *Feb. 13, 2001

(54) SUNROOF DEVICE FOR A VEHICLE

(75) Inventor: Ryo Tsuruo, Kanagawa (JP)

(73) Assignee: Ohi Seisakusho Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/143,356

(22) Filed: Aug. 28, 1998

(30) Foreign Application Priority Data

Aug. 28, 1997 (JP) .................................................. 9-232817

(51) Int. Cl.$^7$ ..................................................... B60J 7/057
(52) U.S. Cl. ........................ 296/223; 296/216.08; 384/42
(58) Field of Search .............................. 296/223, 216.08; 384/42; 290/222

(56) References Cited

U.S. PATENT DOCUMENTS

| | | | |
|---|---|---|---|
| 1,184,614 | * 5/1916 | Brightman et al. ..................... | 384/42 |
| 3,290,087 | * 12/1966 | Werner ................................. | 296/222 |
| 3,497,272 | * 2/1970 | Caubet ................................. | 384/42 |
| 3,801,090 | * 4/1974 | Gillen . | |
| 4,245,864 | 1/1981 | Shitanoki ............................. | 296/222 |
| 4,403,805 | * 9/1983 | Strem, Jr. .......................... | 296/222 X |
| 4,632,449 | 12/1986 | Masuda ................................ | 296/222 |
| 4,650,243 | * 3/1987 | Hanley et al. ................... | 296/223 X |
| 4,877,285 | * 10/1989 | Huyer ............................... | 296/223 X |
| 5,836,644 | * 11/1998 | Smith ............................... | 296/223 X |
| 6,024,404 | * 2/2000 | Stallfort et al. ..................... | 296/223 |

FOREIGN PATENT DOCUMENTS

| | | | |
|---|---|---|---|
| 3444947 | * 6/1986 | (DE) .................................... | 296/223 |
| 361175712 | * 8/1986 | (JP) ...................................... | 384/42 |

* cited by examiner

Primary Examiner—Dennis H. Pedder
(74) Attorney, Agent, or Firm—Foley & Lardner

(57) ABSTRACT

A sunroof device for vehicles uses rods in place of the cable, which is inserted in a guide rail in the convention sunroof device. In addition to guide members, a shoe is provided at a predetermined position on each rod such that the shoe is located closer to the inner wall of the guide rail than the outer peripheral surface of the rod when viewed in cross section.

16 Claims, 9 Drawing Sheets

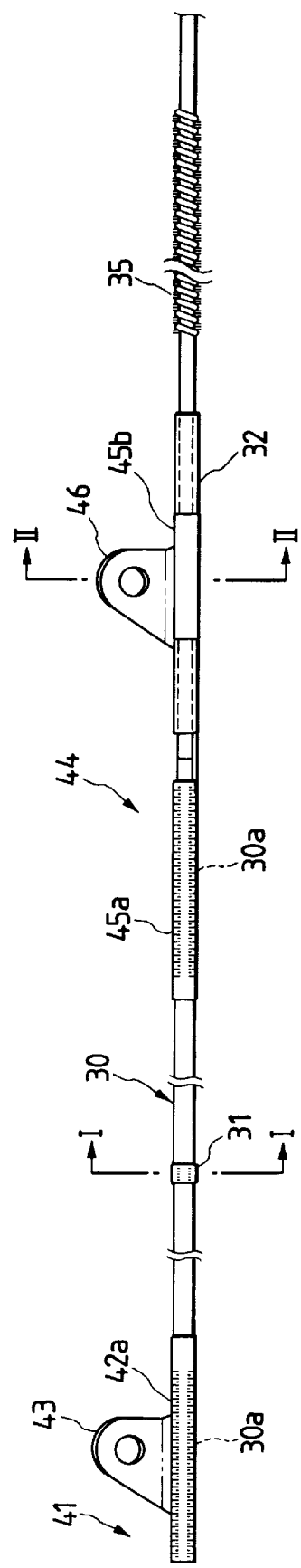
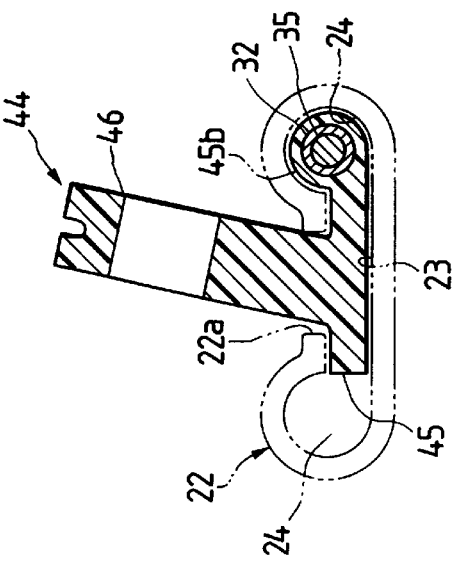
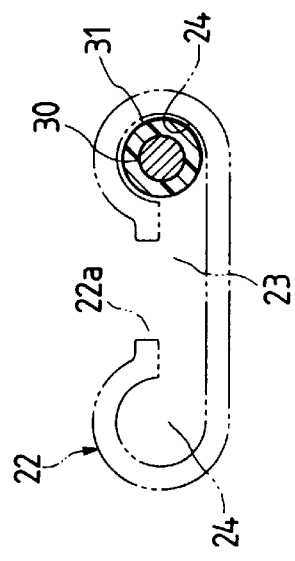
FIG. 2
FIG. 4
FIG. 3

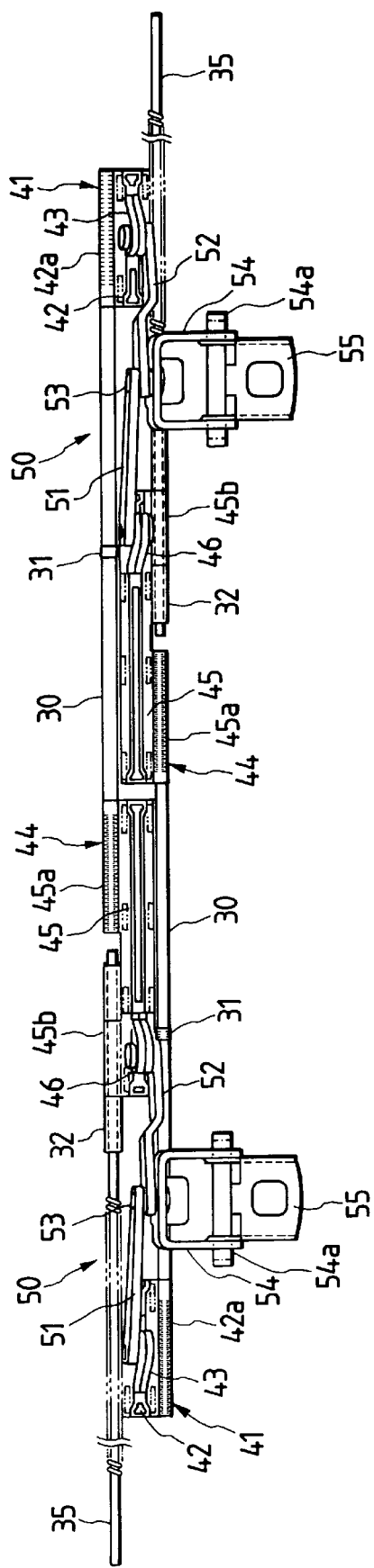

SUNROOF DEVICE FOR A VEHICLE

BACKGROUND OF THE INVENTION

1. Field of the Invention

The present invention relates to a sunroof device for vehicle in which a guide rail is disposed along a roof opening of a vehicle, rods to be pushed and pulled and guide members attached to said rods are placed within said guide rail, and said guide members are dynamically coupled with a drive mechanism for driving a lid to open and close the roof opening.

2. Description of the Related Art

A conventional sunroof device of this type is illustrated in FIG. 11. As shown, a guide rail 1 is usually disposed along the rear end of an opening formed in the roof of a vehicle. A cable 2 is inserted into the guide rail 1. The cable is pushed and pulled by a cable drive source, e.g., a motor.

Guide members 3, which are slidably inserted into the guide rail 1, are attached to the cable 2. A support portion 4 of each guide member 3 is protruded from and above an opening groove 1a of the guide rail 1 when the guide member 3 is inserted into the guide rail 1. The support portion 4 supports a link (not shown) of a drive mechanism for driving the lid to open and close the roof opening.

The cable 2 is capable of highly efficiently transmitting a load in a pulling direction. When it is moved in a pushing direction, a relatively large load acts on the cable as the result of, for example, frictional resistance of the guide member 3, and the cable is bent and buckled. For this reason, in the cable movement in the pushing direction, the power transmission efficiency is extremely reduced and hence, a large motor torque is required. If the motor torque is increased, sometimes the motor fails to satisfactorily move the cable.

Recently, to cope with this problem, there is a proposal to use the rods, in place of the cable 2, for the linear portion or a large R portion of the guide rail 1.

In this proposal using the rods in place of the cable, the rod diameter may be increased to lessen a chance of buckling of the rod. However, the increase of the rod diameter creates another problem to secure an unsatisfactory clearance between the rod and the inner wall of the guide rail since the space within the guide rail 1 is limited in the diametrieal direction of the rod When the diameter of the rods is large in the proposed sunroof structure, when the rod is buckled, it strongly hits the inner wall of the guide rail 1, to generate offensive or harsh sound. When the rod diameter is small, the rod is liable to be buckled, the power transmission efficiency is reduced, and the sunroof device operation fails, as in the case of using only the cable.

SUMMARY OF THE INVENTION

Accordingly, an object of the present invention is to provide a sunroof device for vehicle which can solve the problems of the reduction of power transmission efficiency and harsh sound generation, which are due to the buckling of the rods, with a simple construction and low cost by such a unique construction that the rods inserted into the cable are used in place of the cable, and at least one shoe is coupled with each rod.

[1] To achieve the above object, there is provided a sunroof device for a vehicle in which a guide rail is disposed along a roof opening of the vehicle, rods to be pushed and pulled and guide members attached to said rods are placed within said guide rail, and said guide members are dynamically coupled with a drive mechanism for driving a lid to open and close the roof opening, wherein a shoe is provided at a predetermined position on each said rod such that said shoe is located closer to the inner wall of said guide rail than the outer peripheral surface of said rod when viewed in cross section.

[2] In the sunroof device of [1], said shoes are coupled with each said rod while being equidistantly arranged along said rod.

[3] In the sunroof device of [1] or [2], said shoe is made of synthetic resin, and integrally jointed to the knurled outer surface of each said rod by molding.

The operation of the sunroof device thus constructed will be described.

The rods are placed within said guide rail, although the cable is placed within the guide rail in the conventional sunroof device. In this case, the diameter of each rod is selected so as to secure a satisfactory clearance between the rod and the inner wall of the guide rail.

In addition to the guide members, a shoe is provided in advance at a predetermined position on each said rod such that said shoe is located closer to the inner wall of said guide rail than the outer peripheral surface of said rod when viewed in cross section. After the assembling, when the rod is pushed or pulled, the guide members slide within the guide rail. If a load acts on the rod in the pushing direction during the sliding movement of the guide members, the rod is hard to be buckled since it has a larger strength than the cable.

When a large load acts on the rod in the pushing direction, bending and buckling of the rod are about to occur, the shoe located at the predetermined position on the rod is pressed, while sliding, against the inner wall of the guide rail (the shoe is pressed against the inner wall of the guide rail prior to the outer surface of the rod). Therefore, it is possible to reliably prevent the rod from being buckled, with a simple structure. Further, the power transmission efficiency is not reduced and no harsh sound is generated.

In the sunroof device of [2], said shoes are coupled with each said rod while being equidistantly arranged along said rod.

Therefore, the prevention of the buckling of the rods is more reliable.

In the sunroof device of [3], said shoe is made of synthetic resin, and integrally jointed to the knurled outer surface of each said rod by molding. If an excessive load acts on the shoe, the shoe never slips off the rod.

BRIEF DESCRIPTION OF THE DRAWINGS

In the accompanying drawings:

FIG. 2 is a front view showing rods and guide members, which constitute a sunroof device for vehicle according to the a first embodiment of the present invention;

FIG. 3 is a cross sectional view taken along line I—I in FIG. 2, showing a portion of a rod to which a shoe is applied in the sunroof device according to the first embodiment of the present invention;

FIG. 4 is a cross sectional view taken along line II—II in FIG. 2, showing a portion of a rod to which a guide member is attached in the sunroof device according to the first embodiment of the present invention;

FIG. 5 is a plan view showing a major portion of the sunroof device according to the first embodiment of the present invention;

DETAILED DESCRIPTION OF THE PREFERRED EMBODIMENTS

Some specific embodiments of the present invention will be described with reference to the accompanying drawings.

Figure 7:
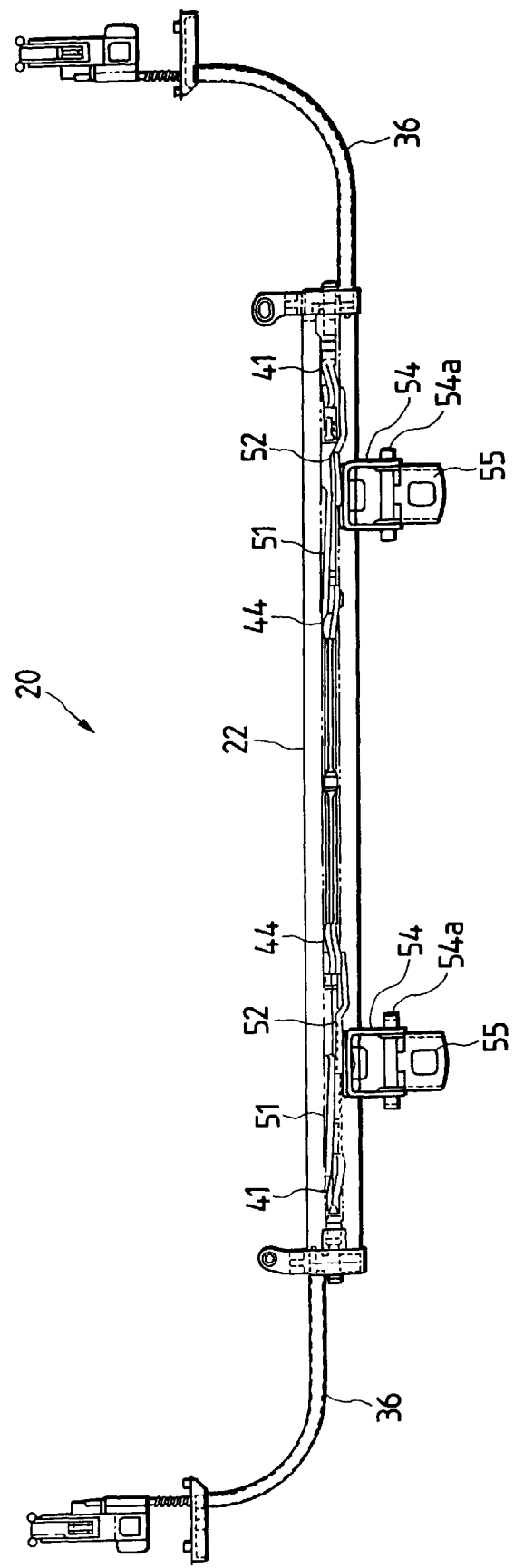
FIG. 7 is a plan view showing the sunroof device according to the first embodiment of the present invention.
Figure 8:
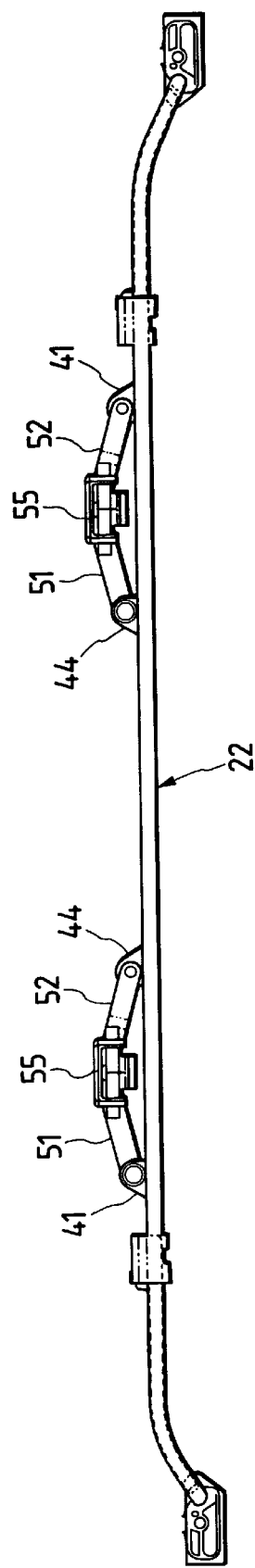
FIG. 8 is a front view showing the sunroof device according to the first embodiment of the present invention.
Figure 9:
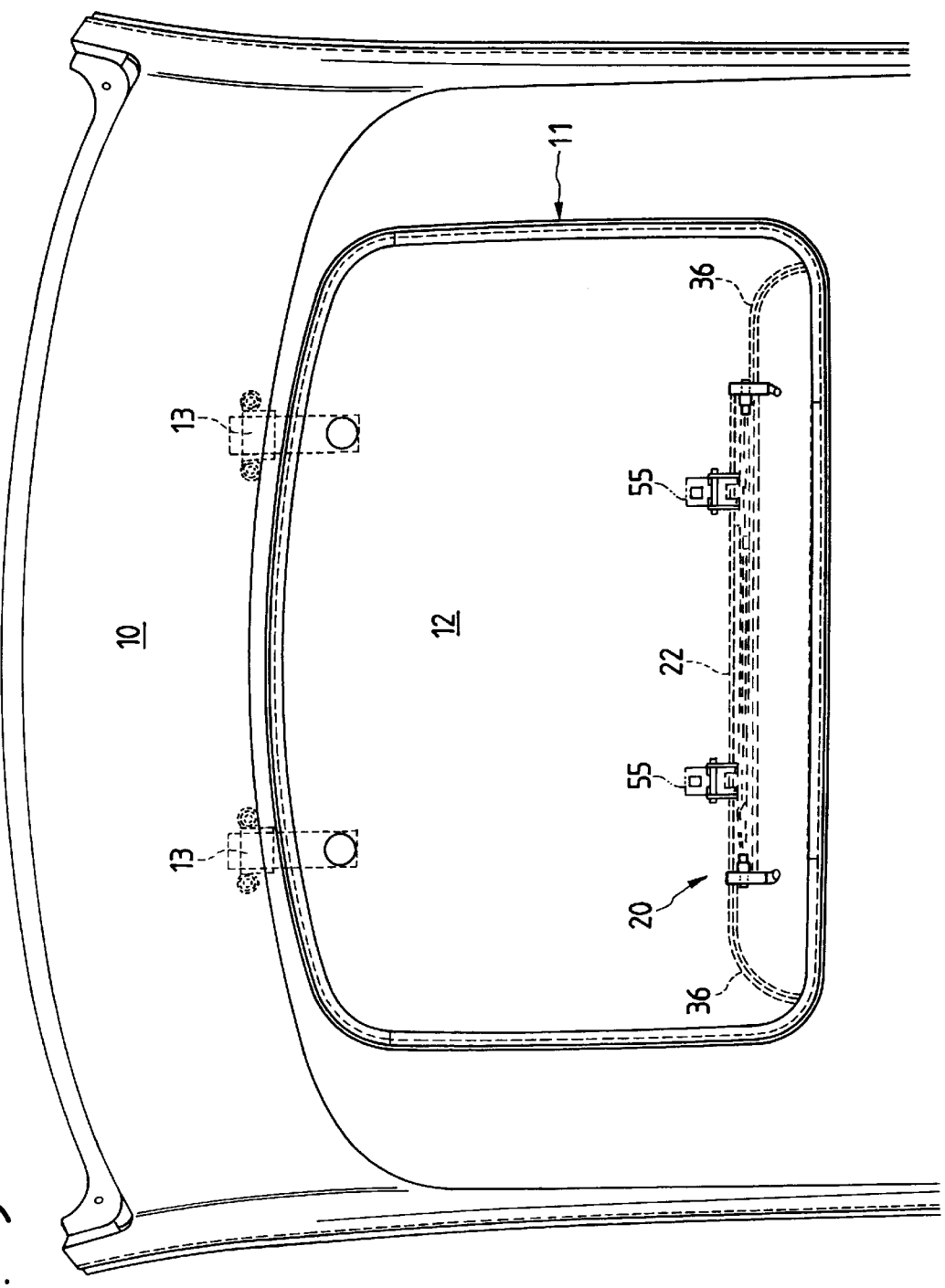
FIG. 9 is a plan view showing the sunroof device installed to the roof of a vehicle.

FIGS. 1 through 9 cooperate to show a first embodiment of the present invention. Reference is first made to FIG. 9. A roof 10 of a vehicle body includes an opening 11 and a lid 12 to close the opening 11. A pair of flexible hinges 13 are arranged along the front end edge of the opening 11 and supported in a cantilever fashion. The front edge of the lid 12 is fastened to the fore ends of the flexible hinges 13.

A sunroof device 20 opens and closes the roof 10 by lifting and lowering the rear end of the lid 12. The sunroof device 20 includes a guide rail 22, which is arranged along the rear edge of the opening 11. As shown in FIGS. 3 and 4, the guide rail 22 has an opening groove 22a, and its cross section is substantially uniform over its entire length.

More specifically, the guide rail 22 includes a horizontal groove 23 and a couple of guide grooves 24 for guiding rods 30 which is made of steel (for example, JIS:SS400). The guide grooves 24 are formed at both ends of the guide rail 22 when viewed in cross section, and have each a circular cross section opened to the inner side of the guide rail. The space between the circular guide grooves 24 serves as the opening groove 22a (already mentioned) which is a long strip when viewed from above. The rods 30 are moved in opposite directions when driven, within the guide grooves 24.

Figure 1:
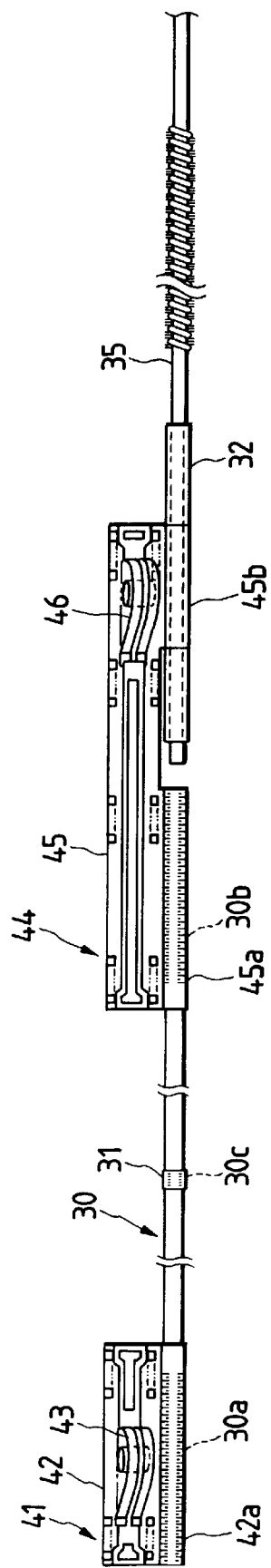
FIG. 1 is a plan view showing rods and guide members, which constitute a sunroof device for vehicle constructed according to a first embodiment of the present invention.

Reference is made to FIG. 1. As shown, a (first) guide member 41 is attached to the distal end 30a of each rod 30. Another (second) guide member 44, different in shape from the guide member 41, is attached to the base end 30b of each rod 30. A cable 35 is connected to the base end 30b of each rod 30 with the guide member 44 inserted therebetween. The cable 35, while being covered with guide tubes 36, are connected to a drive source, as shown in FIG. 7. A shoe 31 for rod buckling prevention is applied to a mid position of the rod 30 between the guide members 41 and 44.

Two couples of the guide members 41 and 44 respectively for the guide grooves 24 are slidably inserted into the guide rail 22. Each of the guide members 41 includes a base portion 42 and a support portion 43. The base portion 42 is placed in the horizontal groove 23 of the guide rail 22. The support portion 43 extends upright from the base portion 42.

Each of the guide members 44 also includes a base portion 45 and a support portion 46. The base portion 45 is placed in the horizontal groove 23 of the guide rail 22. The support portion 46 extends upright from the base portion 45. The second guide member 44 is substantially two times as long as the first guide member 41.

The first guide member 41 is made of hard synthetic resin. One side 42a of the base portion 42 is integrally jointed to the distal end 30a of the rod 30 by molding. The outer peripheral surface of the distal end 30a of each of the rods 30 is worked by knurling, pressing, cutting or the like to have small ridges thereon.

The second guide member 44 is also made of hard synthetic resin. The fore-end side 45a of the base portion 45 is integrally jointed to the base or rear end 30b by molding. The rear-end side 45b of the base portion 45 is molded to a caulking tube 32 fastened to the end of the cable 35. The outside diameter of the caulking tube 32 is substantially equal to that of the rod 30. The outer peripheral surface of the rear end 30b of the rod 30 and that of the caulking tube 32 are worked to be knurled by a knurling tool or the like.

The outer peripheral surface of the middle part 30c of the rod 30 is also knurled by a knurling tool or the like. One shoe 31, which is essential to the present invention, is provided at the middle part 30c of the rod. The shoe 31 is circular in cross section. And it is located closer to the inner wall of the guide rail 22 than the outer peripheral surface of the rod 30. The shoe 31 is made of a hard synthetic resin of small coefficient of friction, and integrally jointed to the middle part 30c of the rods 30 by molding process.

Figure 6:
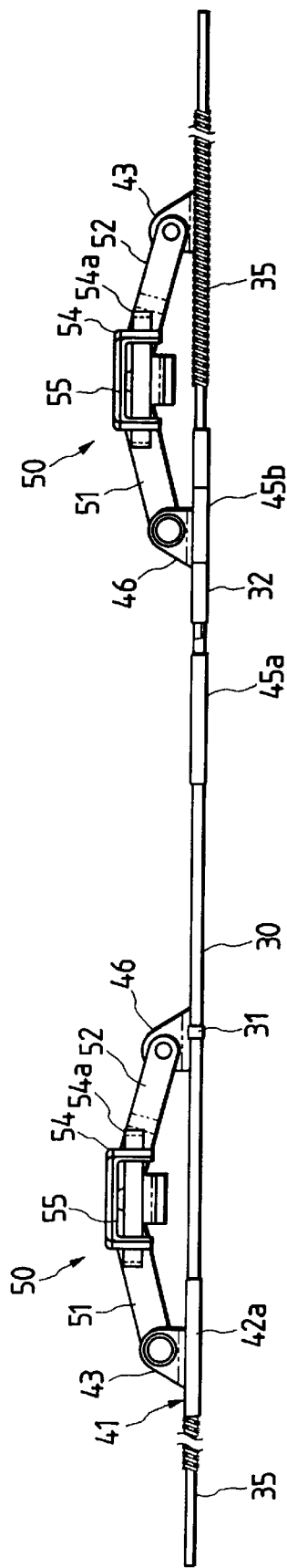
FIG. 6 is a front view showing a major portion of the sunroof device according the first embodiment of the present invention.

As shown in FIGS. 5 and 6, the first guide member 41 for one rod 30 is disposed close to the second guide member 44 of the other rod 30 within the guide rail 22. A link mechanism 50 is provided in association with a set of the first and second guide members 41 and 44, and similarly another link mechanism 50 is provided in association with another set of the first and second guide members 41 and 44.

Each link mechanism 50, like a compass, comprises a pair of link members 51 and 52 hinged to each other at the top end with a pin-like member 53. Each pin-like member 53 supports a relay bracket 54. The relay bracket 54 supports a support bracket 55 with the aid of a horizontal shaft 54a such that the supportbracket 55 is vertically tiltable about the horizontal shaft 54a. The support bracket 55 is brought into engagement with the rear end of the lid 12.

The lower ends of the link members 51 and 52, respectively, are rotatably supported by the support portions 43 and 46 of the first and second guide members 41 and 44, which are extended through and above the opening groove 22a of the guide rail 22. The cables 35, extended from both ends of the guide rail 22, are covered with the guide tubes 36 in a state that those cables may be drawn to the drive source (not shown).

When the drive source is driven and the rods 30 are moved within the guide grooves 24 of the guide rail 22, the first and second guide members 41 are moved to and away from each other. With the motions of the rods 30, each couple of the link members 51 and 52 is turned in a spreading direction, the top end of the coupled link members descends to push the rear end of the lid 12 downward through the mechanism including the pin-like member 53, relay bracket 54 and support bracket 55. When the coupled link members 51 and 52 are turned in a closing direction, the top end of the coupled link members ascends to push the rear end of the lid 12 upward through the mechanism including the pin-like member 53, relay bracket 54 and support bracket 55.

The operation of the sunroof device 20 thus constructed will be described.

In the sunroof device 20, the rods 30 are inserted into the guide rail 22, instead of the cables 35 inserted thereinto in the conventional one. The diameter of each rod 30 is selected so as to produce a proper clearance between the inner wall of the guide rail 22 and the rod inserted thereinto.

As shown in FIG. 1, in addition to the first and second guide members 41 and 44, the shoe 31 (FIG. 3) circular in cross section is set in advance at the middle part 30c of each rod 30 in a state that it is located closer to the inner wall of the guide rail 22 than the outer peripheral surface of the rod 30. The shoe 31 is located at the mid position of the rod 30 between the guide members 41 and 44. The rod 30 is most easily buckled at the mid position when a large load exerts on the rod 30 in the pushing direction. Hereupon, diameter of the rod 30 is 3.9 mm, diameter of the shoe 31 is 5.0 mm, and inner diameter of the guide groove 24 is 5.4 mm.

In the sunroof device 20 having been assembled to the roof 10 of the vehicle, when the rods 30 are pushed or pulled, the couples of first and second guide members 41 and 44 are also slid within the guide rail 22. During the sliding motion of those guide members, a load that acts on the rod 30 in the pushing direction is produced by frictional resistance of the guide members 41 and 44 and other factors. Therefore, the rod has a high strength when comparing with the cable 35, and relatively hard to be buckled.

When a considerably large load acts on the rods 30 and the buckling of the rod is about to occur, the shoes 31 coupled with the middle part 30c of the rods 30, while sliding, are first pressed against the inner walls of the guide grooves 24. Thus, such a simple structure ensures the buckling prevention of the rods 30, and neither reduces the power transmission efficiency nor generates an offensive sound.

The shoes 31 are made of hard synthetic resin (for example, nylon resin such as polyamide) of low friction coefficient (0.27 in one embodiment), and molded to the middle part 30c of the rods 30. If an excessive load acts on the shoe 31, the shoe never slips off the rod 30 because the middle part 30c has the knurled surface. The same thing is true for the jointing of the first side 42a of the guide member 41 and the fore-end side 45a of the guide member 44.

How to open and close the lid 12 in the sunroof device 20 will be described. When the lid 12 is at the full close position and closes the opening 11, each couple of guide members 41 and 44 are separated from each other, and the lower ends of them are moved apart from each other. The coupled link members are spread as shown in FIG. 8. In this state, the coupled link members are flattened and the top end of them lowers the rear end of the lid 12.

In a state that the lid 12 is at the full close position, if the rods 30 are driven by the drive source and moved within the guide grooves 24, one end of each rod pushes outward the guide members 44, while the other end retracts inward from the guide members 41.

Subsequently, each couple of first and second guide members 41 and 44 moves along the guide rail 22 to move to each other; the lower ends of the coupled link members 51 and 52 move to each other; the top of each couple of link members 51 and 52 lifts; and those couples of link members 51 and 52 having been in the spread state (FIG. 8) are put to the closing state (not shown).

In the closing state, the top end of the coupled link members 51 and 52 pushes upward the rear end of the lid 12 and the lid is turned about the flexible hinges 13; the rear end of the lid 12 moves upward to a tilt position; the opening 11 of the roof 10 is opened to ventilate the vehicle inside.

Figure 10:
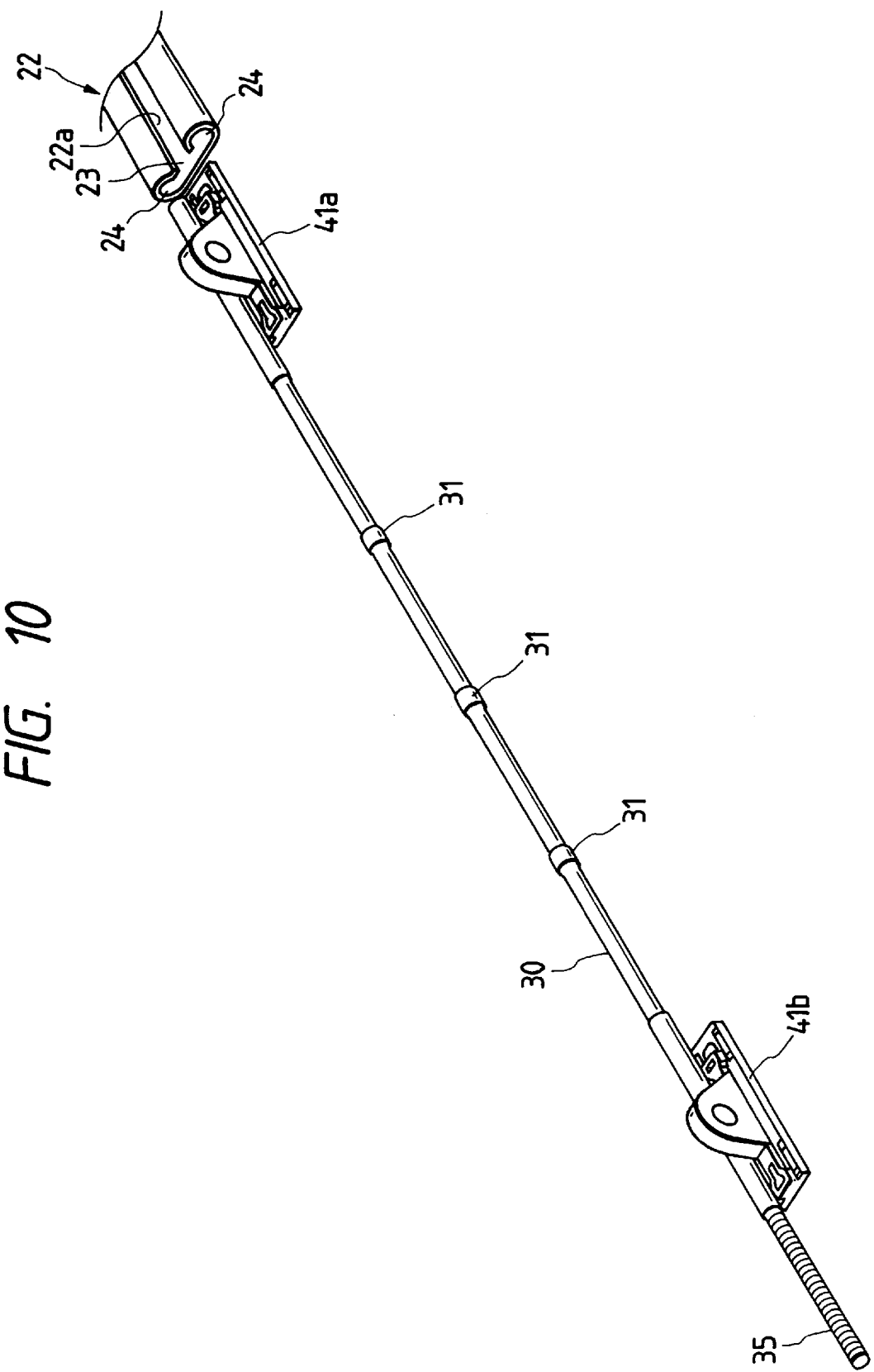
FIG. 10 is an exploded view in perspective of a sunroof device constituting a second embodiment of the present invention, a guide rail, a rod and a guide member of the sunroof device being illustrated in an exploded manner.
Figure 11:
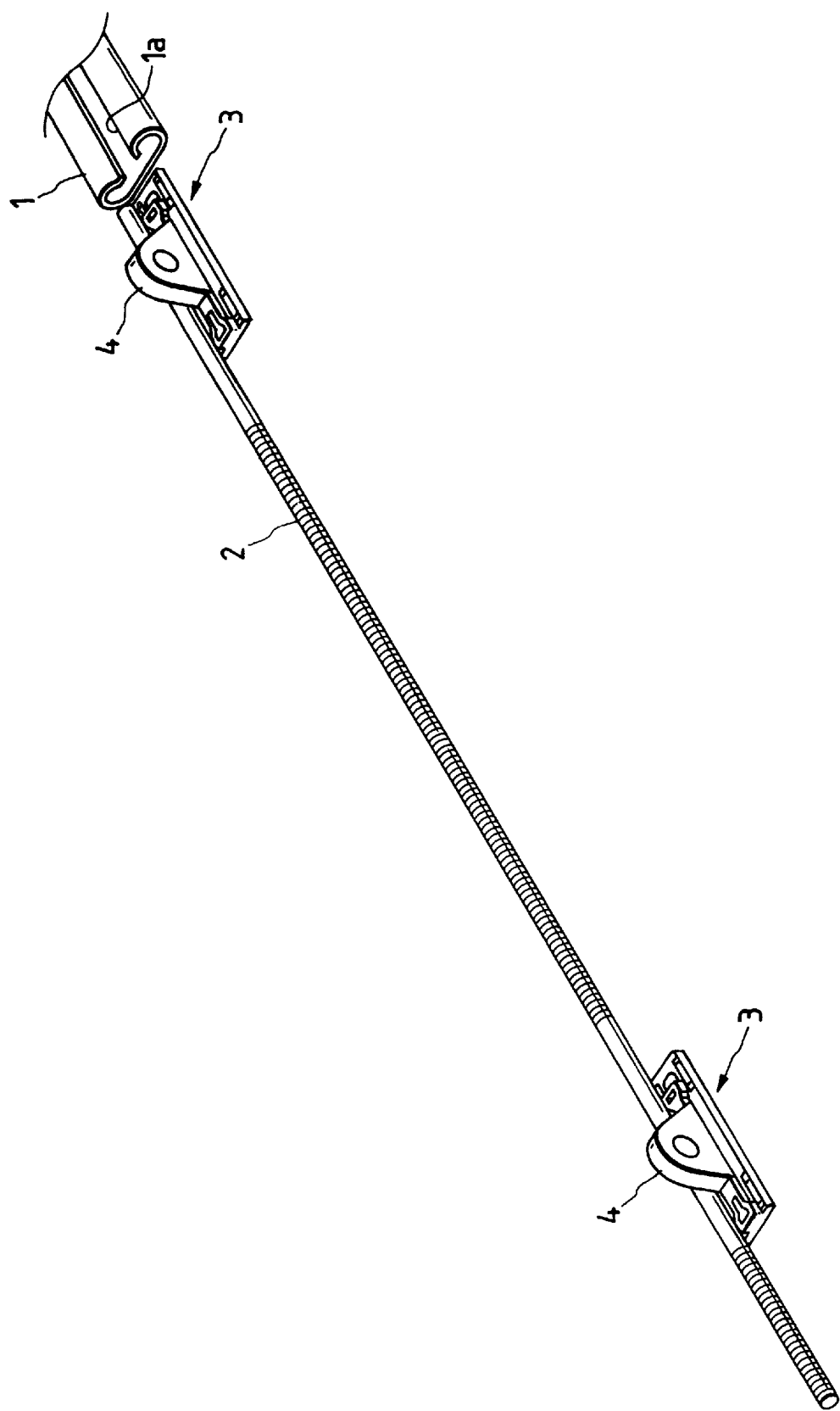
FIG. 11 is an exploded view in perspective of a conventional sunroof device, a guide rail, a rodand a guidemember of the sunroof device being illustrated in an exploded manner.

FIG. 10 shows a second embodiment of the present invention.

In the second embodiment, first and second guide members 41a and 41b are attached to both ends of each rod 30. Three shoes 31 are coupled with the rods 30 while being equidistantly arranged along the rod 30. A cable 35 is coupled with the second guide member 41b. The cable extends from and coaxially with the rod 30. In FIG. 10, like reference numerals designate like or equivalent portions in the figures referred to in describing the first embodiment, for simplicity.

Use of the plural number of shoes 31 provides a reliable prevention of the buckling of the rod 30. The number of shoes and the distance between the adjacent shoes are selected depending on an estimated state of the buckling of the rod, an increase of sliding resistance of the rod, and the like.

It should be understood that the present invention is not limited to the embodiments mentioned above, but may variously be modified, altered and changed within the true spirits of the invention. For example, the shape and the number of guide members and shoes may be modified and changed in accordance with the guide rail used.

As described above, the sunroof device for vehicles uses a rod in place of the cable, which is inserted in the guide rail in the convention sunroof device. In addition to guide members, a shoe is provided at a predetermined position on the rod such that the shoe is located closer to the inner wall of the guide rail than the outer peripheral surface of the rod when viewed in cross section. The rod is stronger than the cable, or hard to be buckled. In the pushing or pulling operation of the rods, when a considerably large load acts on the rod, the shoe is pressed, while being slid, against the inner wall of the guide rail. Therefore, the sunroof device of the invention successfully solves the problems of the reduction of power transmission efficiency and offensive sound generation, which are due to the buckling of the rods, with a simple construction and low cost.

What is claimed is:

1. A sunroof driving apparatus for driving a lid of a roof opening upward and downward, comprising:

a guide rail being disposed along the roof opening;

a rod of substantially uniform cross-section be pushed and pulled within a groove in said guide rail by a drive source, wherein said rod has a diameter less than the diameter of said guide rail groove, and wherein said rod has small ridges formed on an outer surface thereof;

a guide member attached to said rod so as to be pushed and pulled within said guide rail together with said rod;

a driving mechanism for driving the lid upward and downward so as to open and close the roof opening, said guide member being dynamically coupled with said driving mechanism; and a shoe being provided at a predetermined position on said rod to prevent buckling of said rod, wherein said shoe is located closer to an inner wall of said guide rail than an outer peripheral surface of said rod when viewed in cross section, said shoe having a diameter larger than said rod and being in slidable contact with said guide rail groove, said shoe being fixed on said small ridges.

2. The sunroof driving apparatus according to claim 1, wherein a plurality of said shoes are provided on said rod while being equidistantly arranged along said rod.

3. The sunroof driving apparatus according to claim 1, wherein said shoe is made of synthetic resin, and integrally jointed to a knurled outer surface of said rod by molding.

4. A sunroof device comprising:

a lid disposed on a roof opening of a vehicle;

a guide rail being disposed on an edge of the roof opening;

a rod of substantially uniform cross-section disposed within a groove in said guide rail, wherein said rod has a diameter less than said guide rail groove, and wherein said rod has small ridges formed on an outer surface thereof;

a drive source for driving said rod to be pushed and pulled;

a guide member attached to said rod so as to be pushed and pulled within said guide rail together with said rod;

a driving mechanism coupled with said guide member and said lid, said driving mechanism driving said lid upward and downward by a movement of said guide member so as to open and close the roof opening; and a shoe being provided at a predetermined position on said rod to prevent buckling of said rod, wherein said shoe is located closer to an inner wall of said guide rail than an outer peripheral surface of said rod when viewed in cross section, said shoe having a diameter larger than said rod and being in slidable contact with said guide rail groove, said shoe being fixed on said small ridges.

5. The sunroof device according to claim 4, wherein a plurality of said shoes are provided on said rod while being equidistantly arranged along said rod.

6. The sunroof device according to claim 4, wherein said shoe is made of synthetic resin, and is integrally jointed to a knurled outer surface of said rod by molding.

7. The sunroof driving apparatus according to claim 1, wherein said rod is integrally attached in a linear line to a cable, wherein the cable is connected to said driving mechanism.

8. The sunroof device according to claim 4 wherein said rod is integrally attached in a linear line to a cable, wherein the cable is connected to said driving mechanism.

9. A sunroof driving apparatus for driving a lid of a roof opening upward and downward, comprising:

a guide rail being disposed along the roof opening;

a rigid rod of substantially uniform cross-section to be pushed and pulled within a groove in said guide rail by a drive source, wherein said rod has a diameter less than the diameter of said guide rail groove;

a guide member attached to said rod so as to be pushed and pulled within said guide rail together with said rod;

a driving mechanism for driving the lid upward and downward so as to open and close the roof opening, said guide member being dynamically coupled with said driving mechanism; and a shoe being provided at a predetermined position on said rod to prevent buckling of said rod, wherein said shoe is located closer to an inner wall of said guide rail than an outer peripheral surface of said rod when viewed in cross section, said shoe having a diameter larger than said rod and being in slidable contact with said guide rail groove.

10. The sunroof driving apparatus according to claim 9, wherein a plurality of said shoes are provided on said rod while being equidistantly arranged along said rod.

11. The sunroof driving apparatus according to claim 9, wherein said shoe is made of synthetic resin, and integrally jointed to a knurled outer surface of said rod by molding.

12. The sunroof driving apparatus according to claim 9, wherein said rod is integrally attached in a linear line to a cable, wherein the cable is connected to said driving mechanism.

13. A sunroof device comprising:

a lid disposed on a roof opening of a vehicle;

a guide rail being disposed on an edge of the roof opening;

a rigid rod of substantially uniform cross-section disposed within a groove in said guide rail, wherein said rod has a diameter less than said guide rail groove;

a drive source for driving said rod to be pushed and pulled;

a guide member attached to said rod so as to be pushed and pulled within said guide rail together with said rod;

a driving mechanism coupled with said guide member and said lid, said driving mechanism driving said lid upward and downward by a movement of said guide member so as to open and close the roof opening; and a shoe being provided at a predetermined position on said rod to prevent buckling of said rod, wherein said shoe is located closer to an inner wall of said guide rail than an outer peripheral surface of said rod when viewed in cross section, said shoe having a diameter larger than said rod and being in slidable contact with said guide rail groove.

14. The sunroof device according to claim 13, wherein a plurality of said shoes are provided on said rod while being equidistantly arranged along said rod.

15. The sunroof device according to claim 13, wherein said shoe is made of synthetic resin, and integrally jointed to a knurled outer surface of said rod by molding.

16. The sunroof device according to claim 13, wherein said rod is integrally attached in a linear line to a cable, and wherein the cable is connected to said driving mechanism.

\* \* \* \* \*